United States Patent
Dow et al.

(10) Patent No.: US 9,753,722 B2
(45) Date of Patent: *Sep. 5, 2017

(54) AUTOMATICALLY EXPIRING OUT SOURCE CODE COMMENTS

(71) Applicant: International Business Machines Corporation, Armonk, NY (US)

(72) Inventors: Eli M. Dow, Wappingers Falls, NY (US); Rachel E. Kohler, Burleson, TX (US); Kassidy Martz, Durham, NC (US); Christopher T. Woodlief, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/967,677

(22) Filed: Dec. 14, 2015

(65) Prior Publication Data

US 2017/0168815 A1   Jun. 15, 2017

(51) Int. Cl.
G06F 9/44   (2006.01)

(52) U.S. Cl.
CPC .................................. G06F 8/73 (2013.01)

(58) Field of Classification Search
CPC .......................................................... G06F 8/73
See application file for complete search history.

(56) References Cited

U.S. PATENT DOCUMENTS

| | | | |
|---|---|---|---|
| 7,500,221 B2 | 3/2009 | Baumann | |
| 8,046,741 B2 | 10/2011 | Bhogal et al. | |
| 8,375,373 B2 | 2/2013 | Sollich | |
| 8,418,130 B2 | 4/2013 | Tittizer et al. | |
| 8,438,468 B2 | 5/2013 | Berg et al. | |
| 8,495,567 B2 | 7/2013 | Bak et al. | |
| 8,510,706 B1 | 8/2013 | Bartlett | |
| 8,607,193 B2 | 12/2013 | Avrahami et al. | |
| 8,635,591 B2 | 1/2014 | Brown | |
| 9,003,366 B2 | 4/2015 | Zeidman | |
| 9,436,449 B1 * | 9/2016 | Chandnani | G06F 17/30902 |
| 2004/0003383 A1 | 1/2004 | Chenier | |
| 2004/0015843 A1 | 1/2004 | Quan, Jr. | |

(Continued)

OTHER PUBLICATIONS

Eli M. Dow, et al., Pending U.S. Appl. No. 15/177,452 entitled "Automatically Expiring Out Source Code Comments," filed with the U.S. Patent and Trademark Office on Jun. 9, 2016.

(Continued)

*Primary Examiner* — Chameli Das
(74) *Attorney, Agent, or Firm* — Cantor Colburn LLP; Steven Chiu

(57) ABSTRACT

Aspects include a method for expiring out source code comments. The method includes parsing source code to locate one or more comments. The method also includes, for each of the located one or more comments: determining whether the comment specifies expiration criteria; determining whether the expiration criteria meets an expiration threshold based on the comment specifying expiration criteria; and deleting the comment from the source code based on determining that the expiration criteria meets the expiration threshold, the deleting resulting in updated source code. The method further includes storing the updated source code.

8 Claims, 7 Drawing Sheets

(56) References Cited

U.S. PATENT DOCUMENTS

| | | | |
|---|---|---|---|
| 2004/0061716 A1* | 4/2004 | Cheung | G06F 9/542 |
| | | | 715/710 |
| 2005/0005258 A1* | 1/2005 | Bhogal | G06F 8/73 |
| | | | 717/102 |
| 2006/0155639 A1* | 7/2006 | Lynch | G06Q 40/00 |
| | | | 705/38 |
| 2010/0281466 A1* | 11/2010 | Remollino | G06F 11/3624 |
| | | | 717/125 |
| 2010/0306538 A1* | 12/2010 | Thomas | H04L 9/0844 |
| | | | 713/168 |
| 2011/0179138 A1* | 7/2011 | Van Geest | G06F 17/30902 |
| | | | 709/217 |
| 2014/0047413 A1* | 2/2014 | Sheive | H04L 65/403 |
| | | | 717/110 |
| 2016/0162450 A1* | 6/2016 | Chugh | G06F 17/2235 |
| | | | 715/207 |
| 2016/0164816 A1* | 6/2016 | Bhagwan | H04L 51/18 |
| | | | 709/206\ |
| 2016/0202971 A1* | 7/2016 | Frenkiel | G06F 8/73 |
| | | | 707/626 |
| 2016/0274997 A1* | 9/2016 | Kachko | G06F 11/366 |

OTHER PUBLICATIONS

List of IBM Patents or Patent Applictions Treated as Related; (Appendix P), Filed Jun. 9, 2016, 2 pages.

Disclosed Anonymously, "Method and Apparatus for Detecting the Up to Date Status of Task Comments in Object-Oriented Programs", ip.com, IP.Com No. 000231840, Publication Date: Oct. 9, 2013; 7 pages.

Fluri et al., "Do Code and Comments Co-Evolve? On the Relation Between Source Code and Comment Changes," Department of Inormatics, Univerisyt of Zurich, Switzerland, 2007, 10 pages.

Wong et al., "CloCom: Mining Existing Source Code for Automatic Comment Generation", IEEE, 2015, 10 pages.

\* cited by examiner

```
30    /*[]
31        public sychronized int getInLine() {
32            while (wArea [0] == 0) {
33                try   {
34                    wait() ;
35                } catch (InterruptedException e)  {
36                    e.printStackTrace () ;
37                }
38            }
39        }                                              102
40    */
```

```
91    //[] System.out.println(wArea[2] ) ;
                                                         104
```

```
109   /*[]
110   *   for (int i = 0; i < threads; i++) {
111   *       riders[i] = new Rider(coor, i+1) ;
112   *       riders[i] . start();
113   *   }
114   */                                                 106
```

FIG. 1

```
46    /*[7.8.909323]
47        public sychronized int getInLine() {
48            while (wArea [0] == 0) {
49                try   {
50                    wait() ;
51                } catch (InterruptedException e)  {
52                    e.printStackTrace () ;
53                }
54            }
55        }
56    */
```
202

```
91    //[2.3.54] System.out.printIn(wArea[2] ) ;
```
204

```
109   /*[1.2.3]
110   *    for (int i = 0; i < threads; i++) {
111   *        riders[i] = new Rider(coor, i+1) ;
112   *        riders[i] . start();
113   *    }
114   */
```
206

FIG. 2

AUTOMATICALLY EXPIRING OUT SOURCE CODE COMMENTS

BACKGROUND

The present invention relates generally to computer application software and, more specifically, to automatically expiring out source code comments.

It is quite common for users to comment out sections of code when they are debugging and writing application programs. This can cause the code base to become cluttered with extraneous commented out code and/or comments which are out of date. This clutter can lead to confusion or mistakes and can make working with the code much more difficult.

SUMMARY

Embodiments include a method, system, and computer program product for expiring out source code comments. A method includes parsing source code to locate one or more comments. The method also includes, for each of the located one or more comments: determining whether the comment specifies expiration criteria; determining whether the expiration criteria meets an expiration threshold based on the comment specifying expiration criteria; and deleting the comment from the source code based on determining that the expiration criteria meets the expiration threshold, the deleting resulting in updated source code. The method further includes storing the updated source code.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 1 depicts source code with expiring comments in accordance with some embodiments of this disclosure;

FIG. 2 depicts source code with expiring comments having version information in accordance with some embodiments of this disclosure;

DETAILED DESCRIPTION

Figure 3:
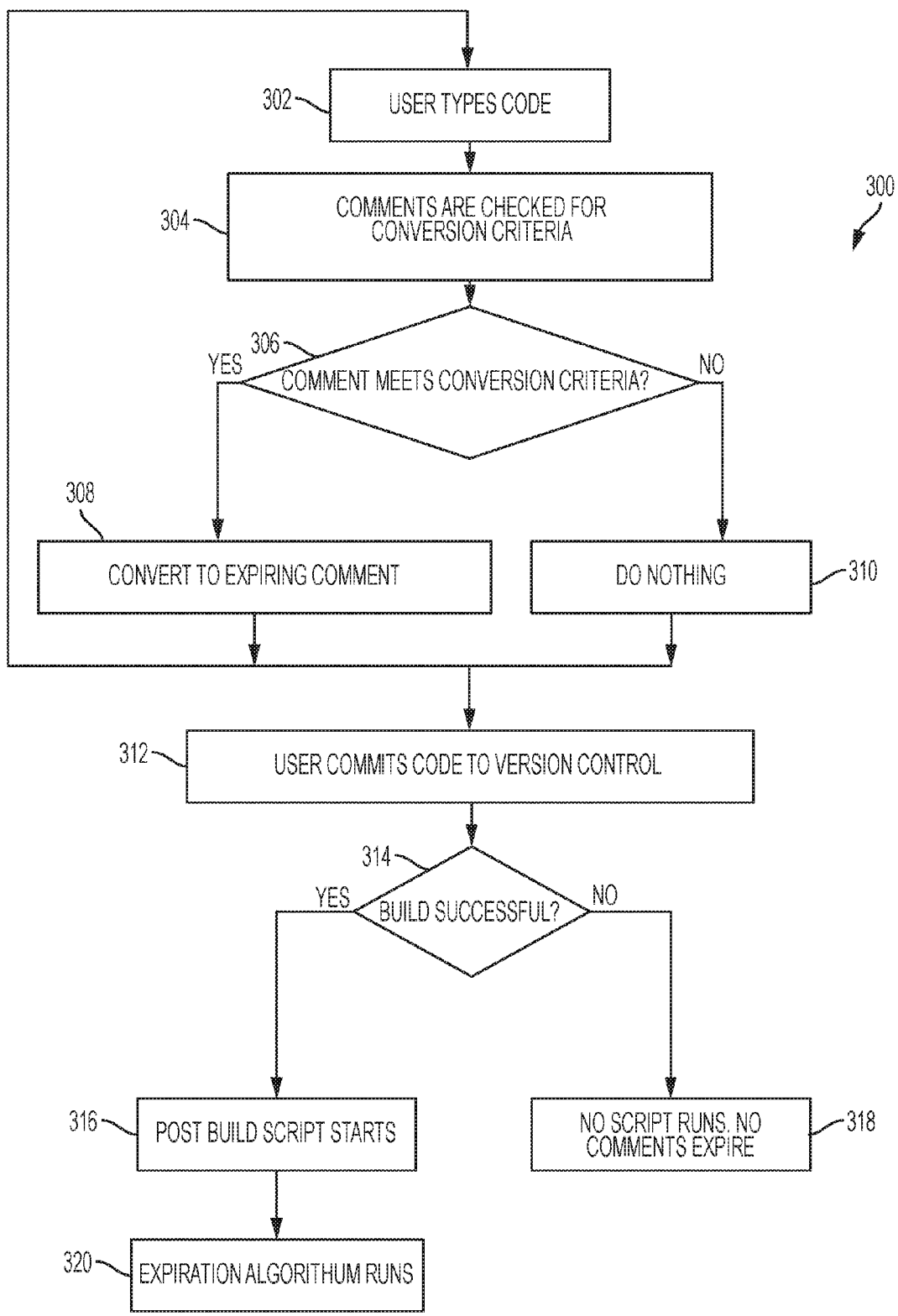
FIG. 3 depicts a flow diagram for marking and expiring comments in source code in accordance with some embodiments of this disclosure.

Embodiments of the present disclosure include a tool for programmers that can eliminate comments in source code which are no longer necessary or useful. Comments can be effectively phased out of source code by expiring them due to manual intervention and annotation by a programmer. Comments can also be phased out through the use of automated heuristics based on integrated development environment (IDE) actions and integration with a build system and/or version control system.

In embodiments, these expiring comments are indicated using a new commenting annotation. Expiring comments can be set by the user or can be automatically determined based on common programming heuristics. In embodiments, each expiring comment contains expiration criteria, and when it is determined this criterion no longer falls within the acceptable threshold (i.e., that the expiration criteria meets an expiration threshold), the comment is considered to be expired and removed from the source code.

Embodiments can be used when a programmer is writing new code and the code does not work as expected. Rather than delete everything that was just written, the programmer can comment out various sections (in case it is later decided this code was needed) and optionally add new code. The process of adding sections of code and commenting out other sections of code can continue until the program performs as expected. If the programmer comments out the sections using expiring comments, then embodiments can be utilized to remove the commented out code which does not apply to the finished product after it is determined that the program performs as expected.

Another situation where "messy code" (e.g., source code with comments that are no longer useful) can result is when a programmer is modifying an existing program. Rather than permanently deleting the existing source code, the programmer comments out sections while making modifications. Messy code can also occur when a programmer is inspecting or testing a program and adds source code for this purpose. The programmer can comment out this code for later testing or inspecting, however these additional lines of code are often not needed for future use.

In each of the above scenarios, embodiments can be utilized to save the programmer from having to manually delete all of these no longer necessary comments. Rather, the programmer can allow them to expire after the predetermined expiration criterion is met.

Turning now to FIG. 1, examples of source code with expiring comments are generally shown in accordance with some embodiments of this disclosure. In the embodiment shown in FIG. 1, the notation "//[ ]" or "/*[ ]" is used to indicate that the comment is an expiring comment. In embodiments, a non-expiring comment is indicated by the typical notation of "//" for a one-line comment and "/*" for a multi-line comment with the last line of the comment indicated by the notation "*/". In the embodiment shown in FIG. 1, the addition of "[ ]" to the notation marks the comment as an expiring comment. The brackets ("[ ]") are placeholders for expiration criteria associated with the comment. This notation is just one example, as any notation that is not reserved by the programming language (e.g., the compiler) can be implemented by embodiments. In embodiments, an expiring comment is indicated by a new annotation in the form of a specially formatted comment that includes an expiration criterion. An expiring comment is only valid if it has this annotation.

Referring to source code block 102 in FIG. 1, source code block 102 has been commented out with an expiring comment as shown by the "/*[ ]" in line 30. The expiring comment ends at line 40 in the same manner as a typical comment with a "*/" in line 40. Source code line 104 has in FIG. 1 has been commented out with an expiring comment as shown by the "//[ ]" in line 104. Source code block 106 has been commented out with an expiring comment as shown by the "/*[ ]" in line 109, and ends with the "*/" in line 114. The user can enter expiring comments such as those shown in FIG. 1, which are examples of annotations for expiring comments upon initial creation.

Embodiments of the expiration algorithm look for any kind of comment that starts with brackets ("[ ]"), as seen above on line 30 of source code block 102, line 91 of source code line 104 and line 109 of source code block 106. In an embodiment, the expiring comments can be set to expire based on the version number using a version control system. For example, after the user has finished modifying the source code, the user commits the changes. In an embodiment, at commit, if the build is successful, a post build script parses all of the updated files. In accordance with embodiments, if there is a comment with the special format seen in FIG. 1 on lines 30, 91, and 109 (with no version information in the brackets) the script, which has access to the repository and the current version of a project that the source code belongs to, will add the current version to the comment, for example, between the brackets as expiration criteria.

For the comments which already have the version information (expiration criteria manually entered by a programmer or automatically entered by the system), such as those shown in FIG. 2, embodiments of the post build script will parse the comment and extract the version number. In the embodiment shown in FIG. 2, the version numbers are the expiration criteria. Referring to FIG. 2, source code block 202 contains expiration criteria (version number "7.8.909323") between the brackets at line 46, source code line 204 contains expiration criteria (version number "2.3.54") between the brackets at line 91, and source code block 206 contains expiration criteria (version number "1.2.3") between the brackets at line 109. Embodiments of the script compare the version number in the comment to the current version of the source code. If the version number of the expiring comment is within a threshold defined by the user (i.e. within 20 versions or after version 2.1.x, etc.), then the expiration criteria does not meet the expiration threshold and the expiring comment will remain in the source code. On the other hand, if the version number of the expiring comment has exceeded the user defined threshold, then the expiration criteria meets the expiration threshold and the expiring comment is removed from the source code.

In embodiment, before completing, the post build script will output (e.g., to a memory, to a display, to a printer, to an email account, to a phone number, etc.) the number of comments that expired and were removed. For example, referring to the expiring comments in the program shown in FIG. 2, and if the threshold defined by the user specifies that any comments before 1.3.x are to expire, then the script would determine that only the expiring comment shown in source code block 206 has expired because of the version number on line 109. The post build script would then delete this comment and report on the deletion. The content of the expiring comment(s) deleted can be output and/or a count of the number of expiring comments deleted can be output. In an embodiment the content of the deleted comment is output for the user to approve of the deletion. In an embodiment, the output is to a display screen being of the user committing the changes to the source code.

Embodiments of the system can also automatically determine cases in which regular comments should likely be expiring comments based on common programming heuristics. The following is a set of criteria based on programming heuristics which can be used to determine what comments are likely to be expiring comments. In an embodiment, if a comment meets at least two of these expiring comment criteria, then when the code is compiled a script is run to convert it to an expiring comment (e.g., by adding expiration criteria placeholders and/or expiration criteria to the comment).

Comments which are at Least 80% Source Code.

Programmers often comment out source code as part of the revision and debugging process, and the commented out code becomes unnecessary after the process is completed. Therefore, an embodiment will check the comments line by line to check if they are valid code. This can be done for instance by scanning a line to determine if that line conforms to a syntax parser or regex heuristic suited to the source code language under management. If the content of the comment is at least 80% source code (or some other appreciably high value), the comment will be a candidate for conversion to an expiring comment.

Block Comments Followed by a Successful Build.

The most common method of commenting large portions of already existing text is a block comment. If a programmer is editing code, the programmer may use block comments to quickly eliminate lines of code without permanently deleting them. If this block commenting is followed by a successful build, this indicates that the commented sections may no longer be necessary. In this case, the comment would be a candidate for conversion.

Build Turns from Fail to Success.

If a programmer builds the source code and it fails, the programmer may comment out portions of the code which could be causing the errors. If this commenting is followed by a successful build, then this is an indication that those sections of code are a potential source of error. These comments are a candidate for expiration.

Comments Followed by Writing of New Code.

A programmer may wish to comment out a section of code in order to rewrite it without deleting the original, already successful code. In this case, the programmer will comment out existing code and begin writing new code in close proximity to the commented code. This is an indication that the content of the comment is being replaced by the new code. Therefore, the commented code is a candidate for expiration.

Rewritten Methods.

Building from the previous statement, if an entire method is commented out followed by new writing of the same method declaration, the comment is a candidate for expiration.

Commented Output Statements.

When testing output at various points in the source code, a developer or tester my include test output statements in the code. If these output statements are currently not useful, the developer may comment them out rather than delete so that they can be used later if needed. However, they are not needed for the life of the source code. Therefore, these comments are candidates for expiration.

Block Comments Preceding or Followed by the Use of a Refactor Assistant in an IDE.

Such refactoring operations are generally used to split out commonly used functionality. The notion of "preceding" and "followed by" are a bit nuanced and may be a bit fuzzy in the temporal domain, while also covering broad line distance (even including lines from multiple files in the same source code project).

One or more or none of the above expiring comment criteria can be used by a particular implementation. Additional expiring comment criteria not listed herein can also be used by a particular implementation. Thus, the list of expiring comment criteria is flexible and can be modified based on particular implementation or project requirements.

Additionally, there are cases in which comments should never be automatically converted to expiring comments. In an embodiment, if a comment meets one of the specified expiring comment exclusion criteria, then the comment is not automatically converted to an expiring comment even if it meets two or more of the expiring comment criteria described above. The expiring comment exclusion criteria can include, but are not limited to: documentation comments and/or comments before source code. In embodiments, documentation comments which serve a documentation purpose should never be automatically converted (e.g., Javadoc). Comments before source code or at the beginning of code can indicate a documentation purpose or comments of high importance. In embodiments, any comment placed at the top before any source code will never be automatically converted.

One or more or none of the above expiring comment exclusion criteria can be used by a particular implementation. Additional expiring comment exclusion criteria not listed herein can also be used by a particular implementation. Thus, the list of expiring comment exclusion criteria is flexible and can be modified based on particular implementation or project requirements In an embodiment, if a comment becomes an expiring comment and the user does not want this, they will have the option to override this classification of the comment (e.g., by right clicking on the comment and selecting "Toggle Expiring Comment off").

Turning now to FIG. 3, a flow diagram 300 for marking and expiring comments in source code is generally shown in accordance with some embodiments of this disclosure. In embodiments, the processing shown in FIG. 3 is performed by instructions executing on a computer processor, or computing device. FIG. 3 shows the overall expiration process, from when the user begins to type code to when the comments meeting the expiration criteria are removed. At block 302, the user enters/edits source code as they normally would. Processing continues at block 304 where, as the user is typing, embodiments of the tool described herein check for comments that meet the expiring comment criteria described above. If it is determined, at block 306, that the comment meets the expiring comment criteria, then processing continues at block 308. At block 308, the comment is converted to an expiring comment. In an embodiment, this conversion is performed by inserting the expiring comment notation (e.g., "[ ]") into the comment. An embodiment can also require user verification that the comment is an expiring comment before the system inserts the expiring comment notation. In an embodiment, the expiring comment notation is not inserted into the source code if the comment meets one or more of the expiring comment exclusion criteria.

Once block 308 completes, processing continues at block 302. If it is determined, at block 306, that the comment does not meet the expiring comment criteria, then processing continues at block 310 where the comment is left as a non-expiring comment and processing continues at block 302.

Figure 4:
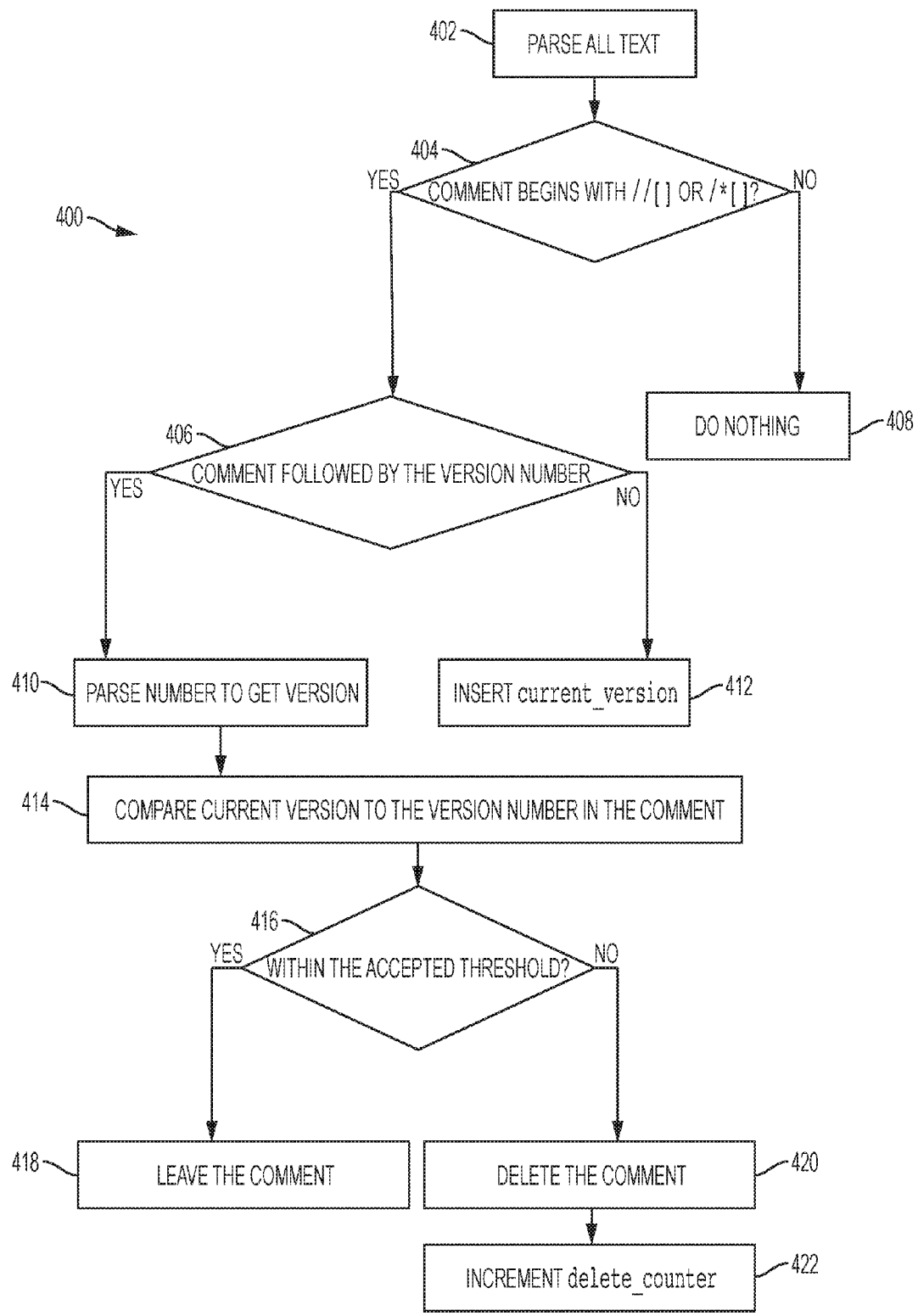
FIG. 4 depicts a flow diagram of an expiration algorithm in accordance with some embodiments of this disclosure.

The processing of the loop that includes block 302 through blocks 308/310 continues until the user is done editing the source code. When the user is no longer editing the source code processing continues at block 312 where the user commits the edited source code to a version control system. At block 314, the version control system determines whether the build was successful. If the build was successful, then a post build script is initiated at block 316 and an embodiment of the expiration algorithm, as described below in reference to FIG. 4, is executed at block 320. If it is determined at block 314, that the build was not successful, then this indicates a problem with the source code and no comments should be removed until the problem is resolved. Thus, in this case processing continues at block 318 with no post build script being executed and no comments being removed from the source code.

Turning now to FIG. 4, a flow diagram 400 of an expiration algorithm is generally shown in accordance with some embodiments of this disclosure. In embodiments, the processing shown in FIG. 4 is performed by instructions executing on a computer processor, or computing device. The processing shown in FIG. 4 depicts an embodiment of an expiration algorithm (e.g., which is part of a post commit script) which is responsible for marking comments as expiring comments, as well as determining and removing expired comments. At block 402, the post commit script parses the text (both comments and source code) in the source code looking for comments. Embodiments perform blocks 404 through 422 for each comment located by the parsing. At block, 404, the script examines the comment for notation that indicates an expiring comment. In the embodiment, this includes looking for a comment that begins with a "//[ ]" or a "/*[ ]." If it is determined at block 404 that the comment is not an expiring comment, then processing continues at block 408, where the comment is not edited. If there are additional comments in the text, then processing can continue at block 404 to process the next comment.

If it is determined at block 404 that the comment is an expiring comment, then processing continues at block 406 where it is determined whether the expiring comment includes a version number. If, as determined at block 406, that the expiring comment does not include a version number, then block 412 is performed to insert the current version number between the placeholder or brackets "[ ]" in the expiring comment. If there are additional comments in the text, then processing can continue at block 404 to process the next comment. If it is determined at block 406 that the expiring comment does include a version number, then processing continues at block 410 where the comment is parsed to determine the version number of the expiring comment. Next, block 414 is performed to compare the current version number of the source code to the version number in the expiring comment. If it is determined at block 416 that the version number in the expiring comment is within a user defined threshold (i.e., the expiration criteria does not meet the expiration threshold), then processing continues at block 418 and the expiring comment is left in the source code. If there are additional comments in the text, then processing can continue at block 404 to process the next comment.

If it is determined at block 416 that the version number in the expiring comment is not within a user defined threshold (i.e., the expiration criteria does meet the expiration threshold), then processing continues at block 420 where the expiring comment is deleted from the source code. At block 422, a deletion counter, that can be used to communicate a number of expiring comments that were deleted to the user, is incremented. In an embodiment, the final value of this deletion counter is displayed to the user upon completion of the version commit. If there are additional comments in the text, then processing can continue at block 404 to process the next comment. Once all of the comments have been processed, the source code commitment process continues and the committed source code is associated with the current version number.

In an embodiment, comment expiration is managed by an IDE based on a build number as the expiration criteria. In this embodiment, the script for parsing and modifying the comments are run after successful builds in the IDE. The script parses and removes the comments using the same structure and algorithms previously stated. However, a successful build will instead trigger the expiration algorithm to run in the IDE. The annotation can indicate a build number instead of a version number. Example notation can include "//*[build_number]" with the expiration criterion being a build number rather than a version number as previously described.

In an embodiment, comment expiration is performed based on a development or test phase used as the expiration criteria. In this embodiment the script for parsing and modifying the comments is run after successful builds in the IDE. Again, the script will parse and remove the comments and can use the same structure and algorithms previously described. In the IDE build files the current development or test phase is included. This can vary between implementations, but could include development cycles such as sprints in an agile development model or test levels such as build verification test (BVT), function verification test (FVT), etc. The comments can be in the format //*[test/dev_phase-_name], with the phase names being defined in a particular order to be deleted. For example, comments will delete after a particular development cycle has passed or after all BVT level tests have passed successfully, etc.

In an embodiment, comment expiration is performed based on a calendar date. Example notation can include "//*[calendar-date]" with the expiration criteria being a calendar date.

Figure 5:
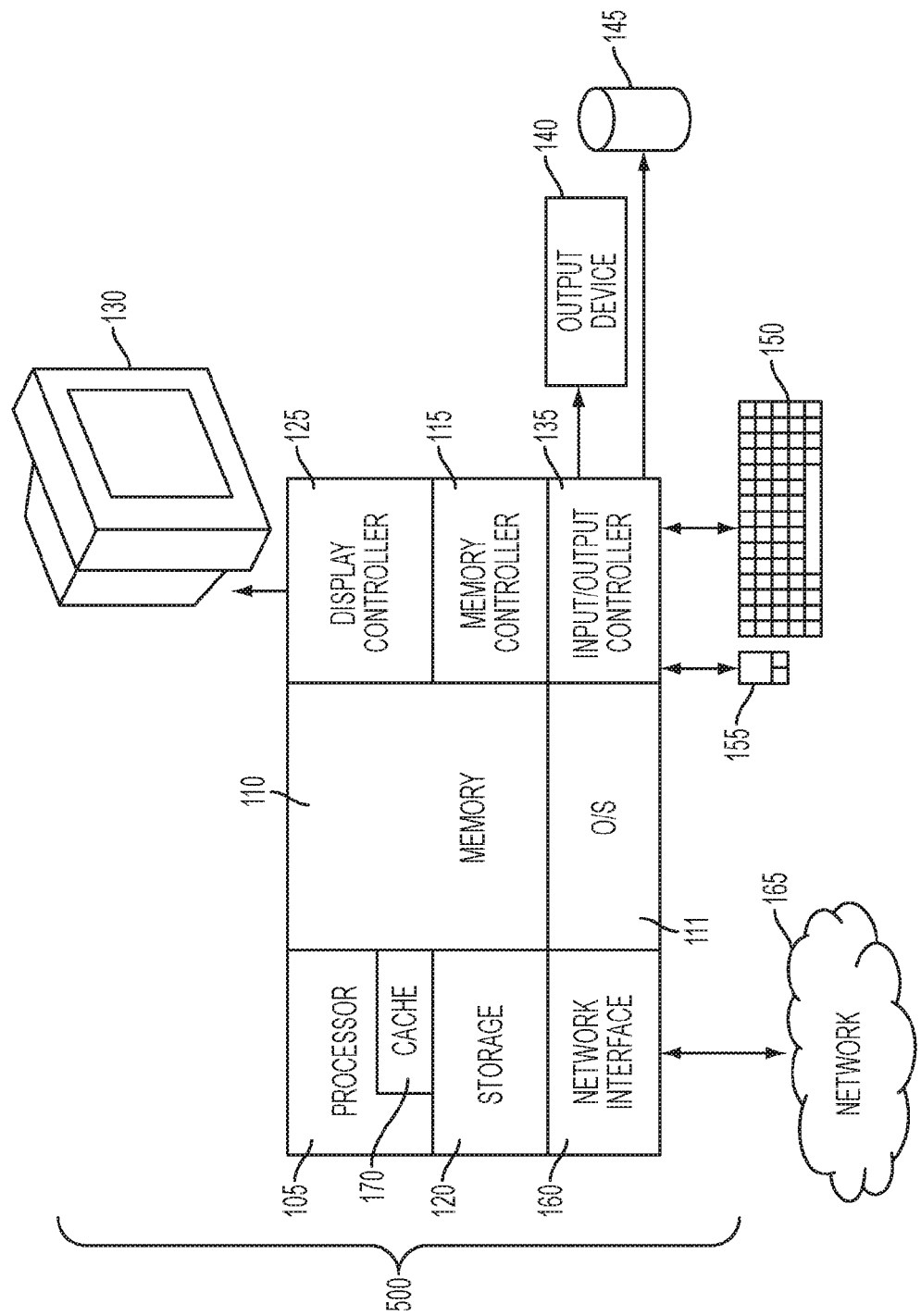
FIG. 5 depicts a block diagram of a computing device for implementing some or all aspects of the system, according to some embodiments of this disclosure.

Turning now to FIG. 5, a computing device 500 for use in determining the position of an object 22 relative to the reflective surface 24 is generally shown in accordance with an embodiment. FIG. 5 illustrates a block diagram of a computing device 500 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computing device 500, such as a cellular phone, a personal digital assistant (PDA), tablet computer, personal computer, workstation, minicomputer, or mainframe computer for example.

In some embodiments, as shown in FIG. 5, the computing device 500 includes a processor 105, memory 110 coupled to a memory controller 115, and one or more input devices 145, and output devices 140, which are communicatively coupled via a local I/O controller 135. These devices 140, 145 may include, for example, a printer, a scanner, a microphone, and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the computing device 500, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 5, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The computing device 500 may further include a display controller 125 coupled to a display 130. In some embodiments, the computing device 500 may further include a network interface 160 for coupling to a network 165. The network 165 may be an IP-based network for communication between the computing device 500 and an external server, client and the like via a broadband connection. The network 165 transmits and receives data between the computing device 500 and external systems. In some embodiments, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computing device 500, such as that illustrated in FIG. 5.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
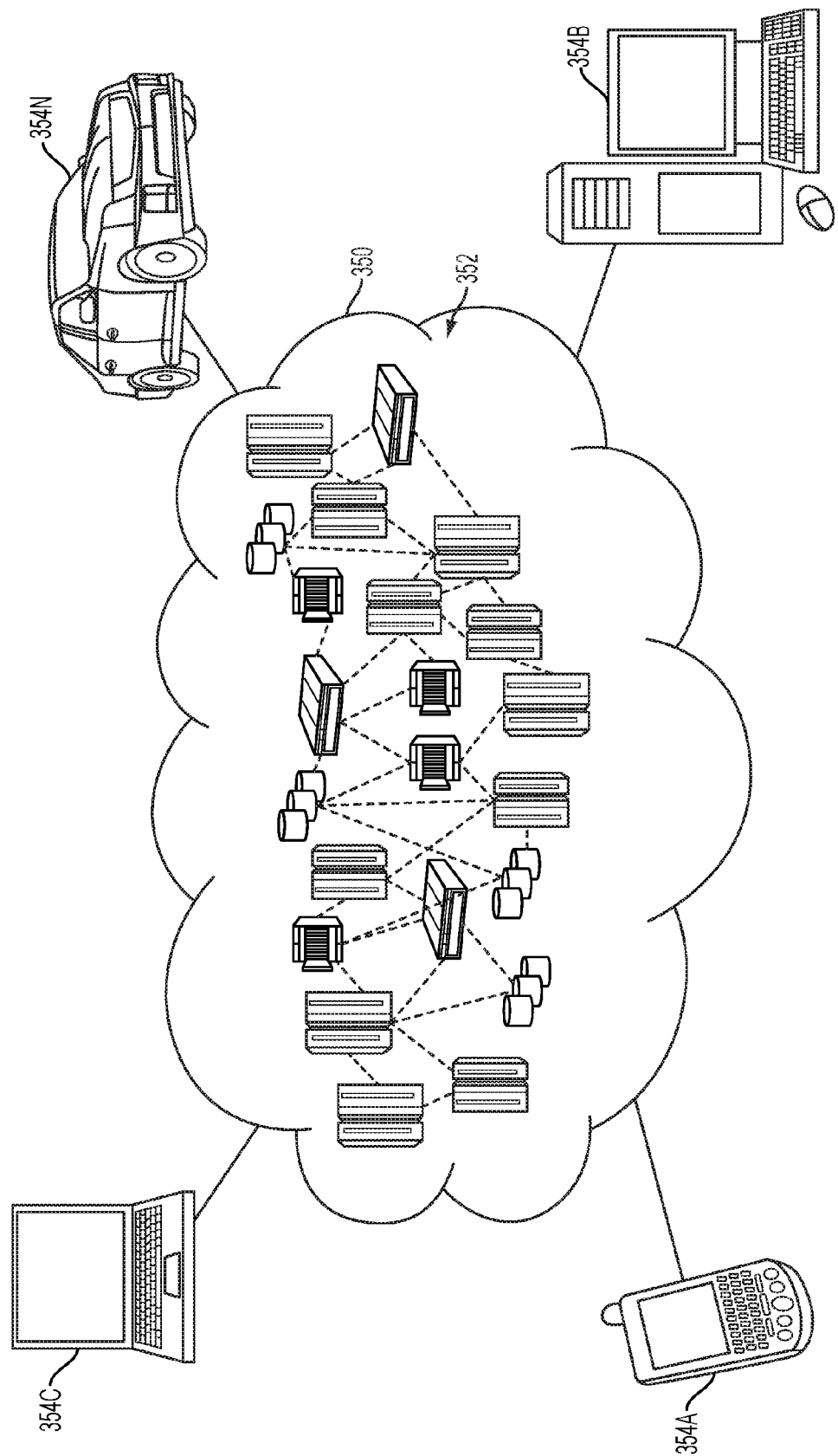
FIG. 6 depicts a cloud computing environment according to some embodiment of this disclosure.

Referring now to FIG. 6, illustrative cloud computing environment 350 is depicted. As shown, cloud computing environment 350 comprises one or more cloud computing nodes 352 with which local computing devices used by cloud consumers, such as, for example, personal digital assistant (PDA) or cellular telephone 354A, desktop computer 354B, laptop computer 354C, and/or automobile computer system 354N may communicate. Nodes 352 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 6 are intended to be illustrative only and that computing nodes 352 and cloud computing environment 350 can communicate with any type of computerized device over any type of network and/or network addressable connection (e.g., using a web browser).

Figure 7:
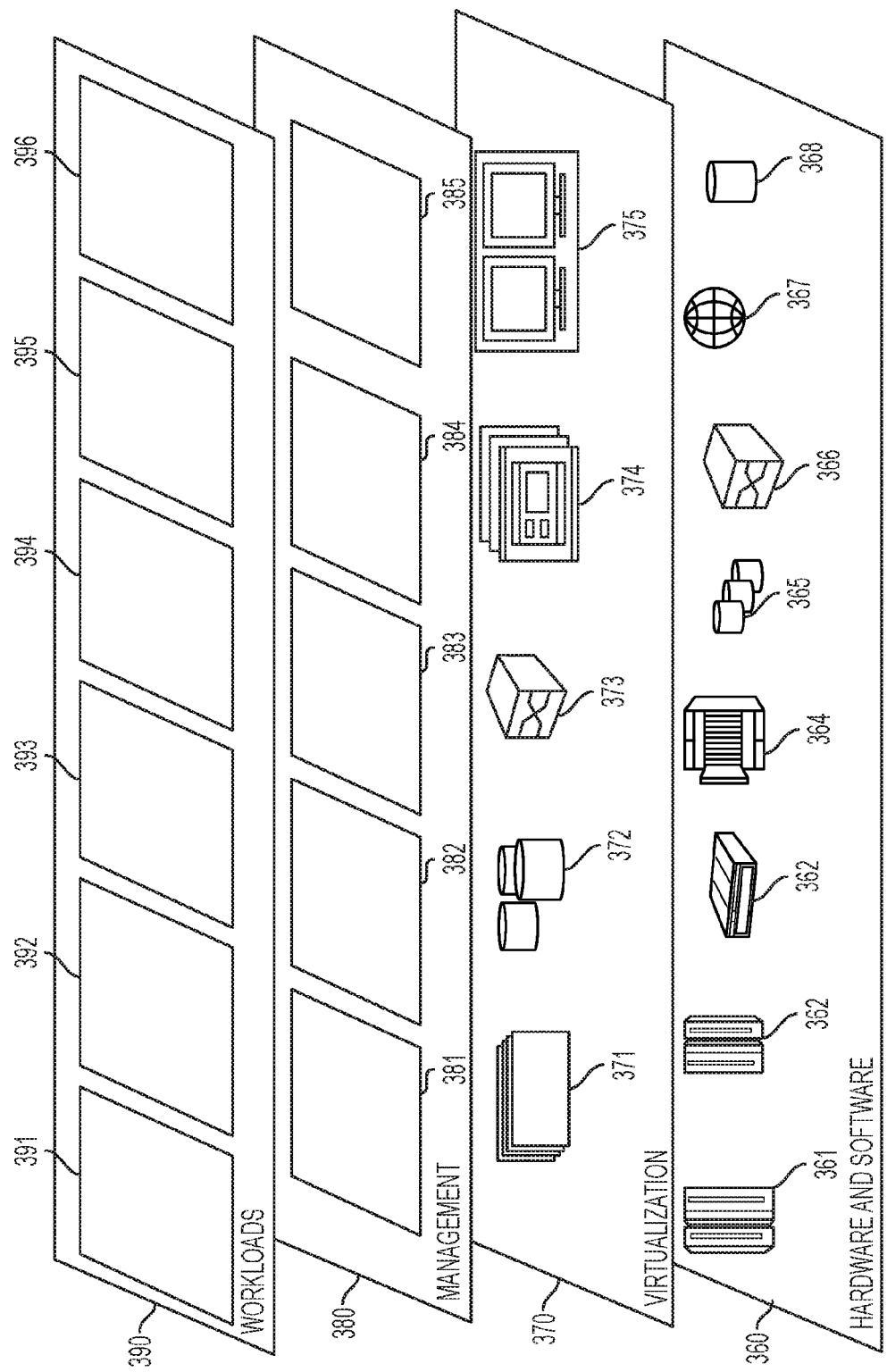
FIG. 7 depicts abstraction model layers according to some embodiments of this disclosure.

Referring now to FIG. 7, a set of functional abstraction layers provided by cloud computing environment 350 (FIG.

6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provides pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and an image processing and object location processing 396. The software development and lifecycle management 392 may perform one or more methods that allow automatically expiring out source code comments to operate, such as but not limited to the methods described in reference to FIGS. 3-4 for example.

Technical effects and benefits of some embodiments include the ability to phase out comments in source code that are no longer necessary or useful. This can result in increased programmer/analyst efficiency due to uncluttered source code. This can also lead to faster parsing and storage savings due to less source code.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for expiring out source code comments, the system comprising:
   a memory having computer readable instructions; and
   one or more processors for executing the computer readable instructions, the computer readable instructions comprising:
   parsing source code to locate one or more comments;
   performing, for each of the one or more comments:
      determining whether the comment specifies expiration criteria, wherein the expiration criteria specifies a version number of the source code at the time that the comment was added to the edited source code and an integrated development environment (IDE) phase in process at the time that the comment was added to the edited source code;
      based on the comment specifying expiration criteria:
      determining whether the expiration criteria meets an expiration threshold, wherein the expiration threshold specifies that any comments added to the source code prior to a particular version number should be deleted and that any comments added to the edited source code prior to a particular IDE phase should be deleted; and
      deleting the comment from the source code based on determining that the expiration criteria meets the expiration threshold, the deleting resulting in updated source code; and
   storing the updated source code.

2. The system of claim 1, wherein the computer readable instructions further comprise adding expiration criteria to at least one of the comments.

3. The system of claim 2, wherein the adding expiration criteria is performed by a processor in response to detecting that the at least one of the comments meets conversion criteria, the conversion criteria based on programming heuristics.

4. The system of claim 2, wherein the adding expiration criteria to at least one of the comments is performed by a user.

5. The system of claim 2, wherein the adding expiration criteria is performed by a processor in response to detecting a placeholder in the comment for the expiration criteria.

6. The system of claim 1, wherein the computer readable instructions further comprise outputting a count of the number of comments that were deleted.

7. A computer program product for expiring out source code comments, the computer program product comprising a non-transitory computer readable storage medium having program instructions embodied therewith, the program instructions executable by a processor to cause the processor to perform:
- parsing source code to locate one or more comments;
- performing, for each of the one or more comments:
  - determining whether the comment specifies expiration criteria, wherein the expiration criteria specifies a version number of the source code at the time that the comment was added to the edited source code and an integrated development environment (IDE) phase in process at the time that the comment was added to the edited source code;
  - based on the comment specifying expiration criteria:
  - determining whether the expiration criteria meets an expiration threshold, wherein the expiration threshold specifies that any comments added to the source code prior to a particular version number should be deleted and that any comments added to the edited source code prior to a particular IDE phase should be deleted; and
  - deleting the comment from the source code based on determining that the expiration criteria meets the expiration threshold, the deleting resulting in updated source code; and
- storing the updated source code.

8. The computer program product of claim 7, wherein the program instructions further cause the processor to perform adding expiration criteria to at least one of the comments.

* * * * *